(12) United States Patent
Bradford et al.

(10) Patent No.: US 11,460,083 B2
(45) Date of Patent: Oct. 4, 2022

(54) SYSTEMS AND METHODS FOR SENSING A BRAKE COMPONENT WITH AN ACOUSTIC SENSOR

(71) Applicant: HALDEX BRAKE PRODUCTS CORPORATION, Kansas City, MO (US)

(72) Inventors: Aaron C. Bradford, Olathe, KS (US); Robert L. Koelzer, Olathe, KS (US)

(73) Assignee: HALDEX BRAKE PRODUCTS CORPORATION, Kansas City, MO (US)

(*) Notice: Subject to any disclaimer, the term of this patent is extended or adjusted under 35 U.S.C. 154(b) by 105 days.

(21) Appl. No.: 16/779,909

(22) Filed: Feb. 3, 2020

(65) Prior Publication Data

US 2021/0239172 A1 Aug. 5, 2021

(51) Int. Cl.
| | |
|---|---|
| *F16D 66/02* | (2006.01) |
| *F16D 65/18* | (2006.01) |
| *G01S 15/08* | (2006.01) |
| *G01S 15/88* | (2006.01) |
| *F16D 65/095* | (2006.01) |
| *F16D 66/00* | (2006.01) |
| *F16D 55/226* | (2006.01) |

(52) U.S. Cl.
CPC ......... *F16D 65/183* (2013.01); *F16D 55/226* (2013.01); *F16D 65/095* (2013.01); *F16D 66/00* (2013.01); *G01S 15/08* (2013.01); *G01S 15/88* (2013.01); *F16D 2066/003* (2013.01)

(58) Field of Classification Search
CPC .......... F16D 66/00; F16D 65/28; F16D 65/38; F16D 65/56; B60T 17/22

USPC ............ 188/1.11 E, 1.11 L, 153 D; 116/208; 340/454; 92/63, 64, 130 A
See application file for complete search history.

(56) References Cited

U.S. PATENT DOCUMENTS 5,372,221 A * 12/1994 Jalbert .................... B60T 17/22
188/1.11 L
6,293,370 B1 * 9/2001 McCann ................. B60T 1/065
188/162

(Continued)

FOREIGN PATENT DOCUMENTS

| DE | 102013112527 A1 | 5/2015 |
|---|---|---|
| ES | 2005637 A6 | 3/1989 |
| KR | 960018290 A | 6/1996 |

OTHER PUBLICATIONS

International Search Report and Written Opinion dated May 27, 2021 for related application PCT/US2021/013538 (14 pgs).

*Primary Examiner* — Christopher P Schwartz
(74) *Attorney, Agent, or Firm* — Stinson LLP

(57) ABSTRACT

A brake actuator with a pushrod configured to actuate a brake of a vehicle. The pushrod is movable between a retracted position and an extended position to actuate the brake. A brake actuator component is operatively coupled to the pushrod. A sensor is configured to emit a signal directed toward the brake actuator component and to receive the signal after the signal bounces off the brake actuator component and is reflected back to the sensor. A disc brake with a disc brake component and a sensor configured to emit a signal directed toward the disc brake component. The sensor is configured to receive the signal after the signal bounces off the disc brake component and is reflected back to the sensor. The sensor may be an acoustic sensor.

9 Claims, 13 Drawing Sheets

(56) References Cited

U.S. PATENT DOCUMENTS

| | | | |
|---|---|---|---|
| 6,352,137 B1* | 3/2002 | Stegall | F16D 65/28 188/1.11 E |
| 6,481,542 B2* | 11/2002 | Giering | F16D 65/567 188/1.11 R |
| 6,501,375 B1* | 12/2002 | Weant | B60T 17/22 340/479 |
| 6,753,771 B2* | 6/2004 | Lesesky | B60Q 1/44 188/1.11 E |
| 7,175,006 B2* | 2/2007 | Plantan | F16D 65/183 188/1.11 W |
| 7,624,849 B2* | 12/2009 | Goncalves | F16D 66/00 188/1.11 R |
| 8,319,623 B2 | 11/2012 | Wallace | |
| 8,944,523 B2 | 3/2015 | Wallace | |
| 9,279,468 B1 | 3/2016 | Philpott | |
| 9,440,631 B2 | 9/2016 | Wallace | |
| 9,482,301 B2 | 11/2016 | Lamkin | |
| 9,855,940 B2* | 1/2018 | Wallace | B60T 17/221 |
| 9,890,826 B2 | 2/2018 | Staahl | |
| 9,964,166 B2 | 5/2018 | Staahl | |
| 10,233,984 B2* | 3/2019 | Evans, Jr. | F16D 55/22655 |
| 10,471,947 B1* | 11/2019 | Sheriff | G01B 17/00 |
| 2001/0030602 A1 | 10/2001 | Osterman et al. | |
| 2004/0251090 A1* | 12/2004 | Morris | F16D 66/00 188/1.11 L |
| 2005/0039988 A1* | 2/2005 | Philpott | F16D 65/568 188/1.11 R |
| 2014/0200761 A1 | 7/2014 | Hamdan | |
| 2016/0327109 A1 | 11/2016 | Staahl | |

* cited by examiner

SYSTEMS AND METHODS FOR SENSING A BRAKE COMPONENT WITH AN ACOUSTIC SENSOR

1. FIELD OF THE INVENTION

The present invention is directed generally to sensing the position of brake mechanisms, and more specifically to sensing a brake component with an acoustic sensor.

2. DESCRIPTION OF RELATED ART

A pneumatic brake system for a large, heavy-duty vehicle such as a bus, truck, semi-tractor, or trailer may include a disc brake which is actuated by an actuator that is operated by the selective application of compressed air. Conventional pneumatic spring brake actuators have both a service brake actuator for actuating the brakes under normal driving conditions by the application of compressed air and a spring-type emergency brake actuator which actuates the brakes when air pressure has been released from a pressure chamber. The emergency brake actuator, or spring brake, includes a strong compression spring which applies the brake when air is released.

There are two main types of pneumatic brake actuators, piston type actuators and diaphragm type actuators. In the diaphragm type brake actuator, two pneumatic diaphragm brake actuators are typically arranged in a tandem configuration, which includes a pneumatic service brake actuator for applying the normal operating brakes of the vehicle, and a spring brake actuator for applying the parking or emergency brakes of the vehicle. Both the service brake actuator and the spring brake actuator include a housing having an elastomeric diaphragm dividing the interior of the housing into two distinct fluid chambers. The piston type brake actuator is substantially similar to the diaphragm type, except that instead of a diaphragm, a piston reciprocates in a cylinder for applying the normal and/or parking brakes of the vehicle.

In a typical service brake actuator, the service brake housing is divided into a pressure chamber and a pushrod chamber. The pressure chamber is fluidly connected to a source of pressurized air and the pushrod chamber mounts a pushrod that is coupled to the brake assembly. The introduction and exhaustion of pressurized air in to and out of the pressurized chamber reciprocates the pushrod in to and out of the housing to apply and release the operating brakes.

In a typical spring brake actuator, the spring brake section is divided into a pressure chamber and a spring chamber by a diaphragm. A pressure plate is positioned in the spring chamber between the diaphragm and a strong compression spring, whose opposing end abuts the housing of the section.

When applying the parking brakes, the spring brake actuator pressure is discharged from the pressure chamber and the large force compression spring pushes the pressure plate and the diaphragm toward the dividing wall between the spring brake actuator and the service brake actuator. In this position, an actuator rod or tube connected to the pressure plate is pushed for applying the parking or emergency brakes and thus immobilizing the vehicle. To release the parking brake, pressurized air is introduced into the pressure chamber of the spring brake actuator to expand the pressure chamber, move the diaphragm and pressure plate toward the opposing end of the spring brake actuator housing, and compress the compression spring.

Disc brakes, in particular for heavy load trucks, are known with different configurations. For example, disc brakes may include either a sliding caliper or a fixed caliper, which overlap one or more brake discs of a vehicle, such as a truck. Disc brakes are operatively connected to the brake actuator such that actuation of the brake actuator moves the brake pads into engagement with the brake disc to brake the vehicle.

Different methods are known for detecting the stroke position of a brake actuator, including the use of string potentiometers, hall-effect sensors, optical sensors, rotary dial visual indicators, and magnetic sensors. While these sensors may generally work for their intended purposes, drawbacks include the following: hall-effect sensors and magnetic sensors require isolation from metal components in the brake system except for the component whose position is being sensed, which must be metal and in close proximity to the sensor; string potentiometers require physical attachment to the component being measured; rotary dial visual indicators must be viewed for inspection; and optical sensors are relatively expensive and sensitive to changes in optical reflectivity.

BRIEF SUMMARY OF THE INVENTION

One embodiment of the invention described herein is directed toward a brake actuator comprising a pushrod configured to actuate a brake of a vehicle. The pushrod is movable between a retracted position and an extended position to actuate the brake. A brake actuator component is operatively coupled to the pushrod. A sensor is configured to emit a signal directed toward the brake actuator component and to receive the signal after the signal bounces off the brake actuator component and is reflected back to the sensor.

In one embodiment, the brake actuator includes a controller communicatively coupled to the sensor and configured to determine a position of the brake actuator component based on data received from the sensor. The sensor may be configured to transmit the data to the controller, the data representative of the time difference between when the sensor emitted the signal and when the sensor received the signal.

In one embodiment, the sensor is an acoustic sensor. The signal emitted by the acoustic sensor is one of an infrasonic signal, a sonic signal, or an ultrasonic signal.

In one embodiment, the sensor includes an emitter configured to emit the signal and a receiver configured to receive the signal. The emitter and receiver may be disposed at generally the same location.

In one embodiment, the brake actuator includes a spring brake actuator including at least one of a diaphragm or a plate, wherein the brake actuator component is one of the diaphragm of the spring brake actuator or the plate of the spring brake actuator.

In one embodiment, the brake actuator includes a service brake actuator including at least one of a diaphragm or a plate, wherein the brake actuator component is one of the diaphragm of the service brake actuator or the plate of the service brake actuator. The brake actuator may also include a spring brake actuator and a second sensor that is configured to emit a second signal toward a portion of the spring brake actuator and receive the second signal after the second signal bounces off the portion of the spring brake actuator and is reflected back to the second sensor.

Another embodiment of the present invention is directed toward a disc brake comprising opposing first and second brake pads configured to move toward one another to engage a brake disc of a vehicle. The disc brake also comprises a disc brake component and a sensor configured to emit a signal directed toward the disc brake component. The sensor is configured to receive the signal after the signal bounces off the disc brake component and is reflected back to the sensor. At least one of the disc brake component and the sensor are configured to move relative to the other as the first and second brake pads move.

In one embodiment, the disc brake includes a controller communicatively coupled to the sensor and configured to determine a position of the disc brake component based on data received from the sensor. The sensor may be configured to transmit the data to the controller, the data representative of the time difference between when the sensor emitted the signal and when the sensor received the signal.

In one embodiment, the sensor is an acoustic sensor. The signal emitted by the acoustic sensor is one of an infrasonic signal, a sonic signal, or an ultrasonic signal.

In one embodiment, the sensor includes an emitter configured to emit the signal and a receiver configured to receive the signal. The emitter and receiver may be disposed at generally the same location.

In one embodiment, the disc brake component is one of a lever of a brake actuation mechanism, a slide pin of a brake carrier or a brake pad retainer configured to support at least one of the first or second brake pads.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

Corresponding reference characters indicate corresponding parts throughout the drawings

DETAILED DESCRIPTION OF PREFERRED EMBODIMENT

First Embodiment of Brake Actuator

Figure 1:
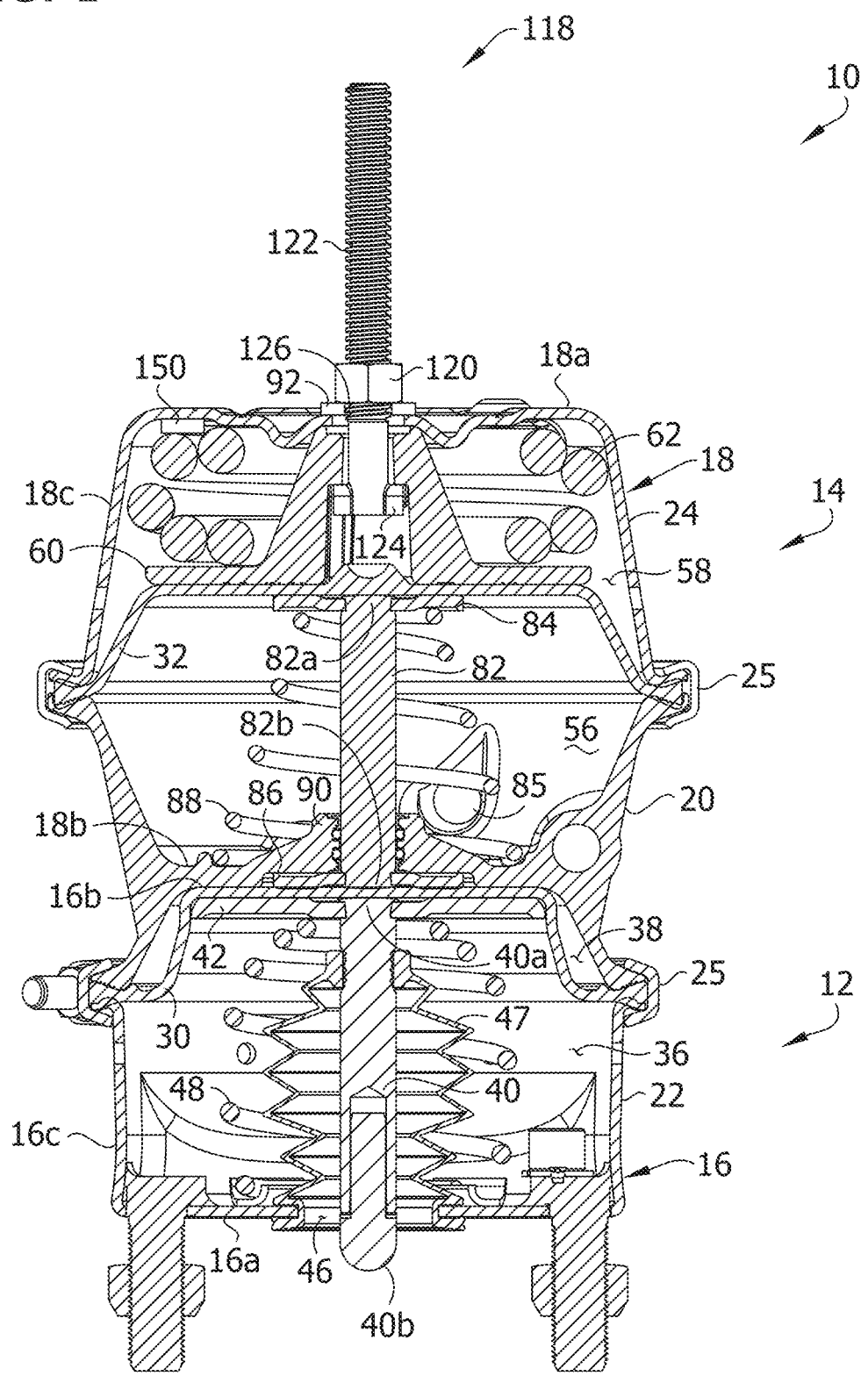
FIG. 1 is a cross-sectional view of a first embodiment of a pneumatic brake actuator having spring and service brake actuators where a caging bolt is shown retracting a spring of the spring brake actuator.

FIGS. 1-4 show a tandem-type pneumatic brake actuator, generally indicated at reference numeral 10, comprising a service brake actuator 12 in combination with a spring brake actuator 14. The service brake actuator 12 applies and releases the service or operating brakes of a vehicle. The spring brake actuator 14 is used to apply the emergency or parking brakes of the vehicle. It is understood that the pneumatic brake actuator 10 is illustrative and that types of brake actuators other than pneumatic are within the scope of the present invention.

The service brake actuator 12 includes a housing 16 having first and second end walls 16a and 16b and a side wall 16c that is joined with and extends between the end walls 16a and 16b. The spring brake actuator 14 includes a housing 18 having first and second end walls 18a and 18b and a side wall 18c that is joined with and extends between the end walls 18a and 18b. The housings 16 and 18 are formed by an adapter housing 20 that is coupled with a service brake cover 22 and a spring brake cover 24. The adapter housing 20 and service brake cover 22 are clamped together with a clamp 25 to secure the service brake cover 22 to the adapter housing 20. Similarly, the adapter housing 20 and spring brake cover 24 are clamped together with another clamp 25 to secure the spring brake cover 24 to the adapter housing 20. The adapter housing 20 defines a common dividing wall separating the service brake housing 16 from the spring brake housing 18 while forming a portion of each housing 16 and 18 such that the second end walls 16b and 18b are integral. Other configurations are within the scope of the present invention.

Movable members, which in this embodiment include elastomeric diaphragms 30 and 32, span the interior of the service and spring brake housings 16 and 18, respectively. A peripheral edge of the diaphragm 30 is sealingly clamped between the adapter housing 20 and service brake cover 22 via the clamp 25. A peripheral edge of the diaphragm 32 is sealingly clamped between the adapter housing 20 and the spring brake cover 24 via the clamp 25. A piston-type brake actuator, which has a piston that spans the interior of a cylindrical spring brake housing instead of a diaphragm, is also within the scope of the present invention.

Referring to the service brake actuator 12, the diaphragm 30 fluidly divides the service brake actuator 12 into a pushrod chamber 36 and a service brake pressure chamber 38. A pushrod 40 has a first end 40a that is positioned within the pushrod chamber 36 and a second end 40b positioned outside of the service brake housing 16. A pressure plate 42 is joined to the first end 40a of the pushrod 40 and abuts diaphragm 30. The pushrod 40 extends from its first end 40a to its second end 40b through an opening 46 in the service brake cover 22. An expandable/condensable sleeve 47 extends between the opening 46 and pushrod 40 to form a fluid tight seal there-between. A return spring 48 is positioned between the first end wall 16a and the pressure plate 42 to aid in biasing the pressure plate 42 and pushrod 40 toward the second end wall 16b of the service brake housing 16. As explained in more detail below, the pushrod 40 is configured to actuate a brake (e.g., disc brake) of a vehicle. The pushrod 40 is movable between a retracted position (FIG. 1) and an extended position (FIG. 3) to actuate the brake. Although not shown, in a brake assembly, the end 40b of the pushrod 40 is operatively coupled to the brake whereby the reciprocation of the pushrod 40 relative to the service brake housing 16 results in the application and release of the brake.

The service brake pressure chamber 38 is fluidly connected to a source of pressurized air through an inlet port (not shown). As the operator of the vehicle applies the brake pedal, pressurized air is introduced into the service brake pressure chamber 38 through the inlet port to reciprocate or move the pushrod 40 from the retracted position to the extended position. The addition of pressurized air into the service brake pressure chamber 38 moves the diaphragm 30, pressure plate 42 and pushrod 40 away from the second end wall 16b toward the first end wall 16a to apply the brakes. As the operator of the vehicle releases the brake pedal, the pressurized air is exhausted from the service brake pressure chamber 38 through the inlet port and the return spring 48 returns the pushrod 40 back to the retracted position shown in FIG. 1.

Referring to the spring brake actuator 14, the diaphragm 32 fluidly divides the spring brake housing 18 into a spring brake pressure chamber 56 and spring chamber 58. A secondary pushrod 82 has a first end 82a that is positioned within the spring brake pressure chamber 56 and a second end 82b positioned in the service brake pressure chamber 38. A first pressure plate 84 is joined to the first end 82a of the secondary pushrod 82 and abuts the diaphragm 32. A second pressure plate 86 is joined to the second end 82b of the secondary pushrod 82 and abuts the diaphragm 30. The secondary pushrod 82 extends from its first end 82a to its second end 82b through a bearing 90 defining an opening in the second end wall 18b of the adapter housing 20. A return spring 88 is positioned between the second end wall 18b and the first pressure plate 84 to aid in biasing the first pressure plate 84 and secondary pushrod 82 toward the first end wall 18a of the spring brake housing 18. The spring brake pressure chamber 56 is fluidly connected to a source of pressurized air through a port 85. A pressure plate 60 is positioned in the spring chamber 58 adjacent to the diaphragm 32. A large force compression spring 62 is placed between the pressure plate 60 and the spring brake cover 24.

Figure 2:
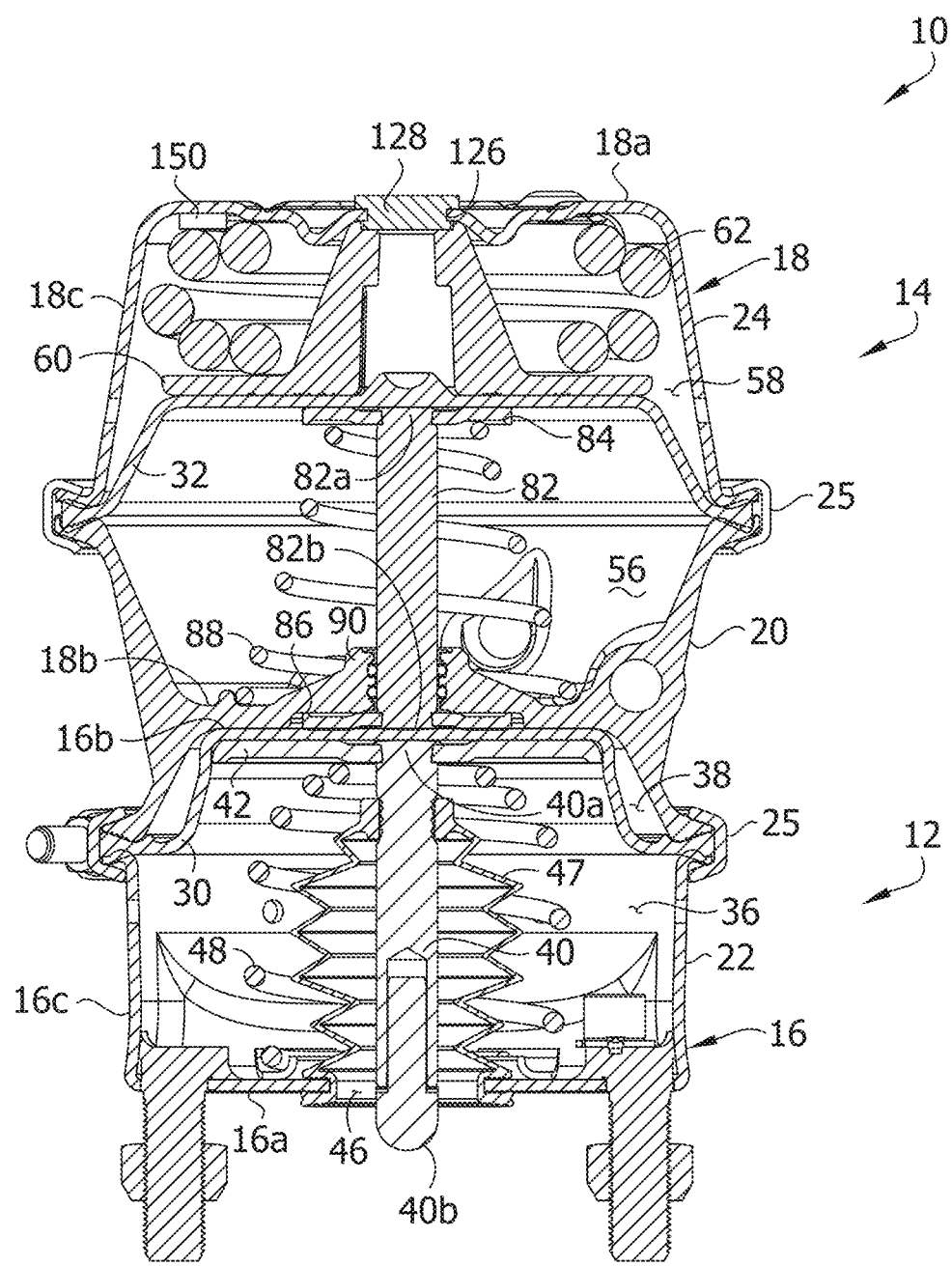
FIG. 2 is a cross-sectional view of the brake actuator of FIG. 1 showing the caging bolt removed and the spring brake actuator retracted.

The brake actuator 10 further comprises a caging bolt assembly 118 (FIG. 1) that is operable to mechanically retract and hold the large force compression spring 62 in a compressed state (as shown in FIG. 1). The caging bolt assembly 118 includes an adjustment nut 120 threaded onto a caging bolt 122 from one end of the caging bolt 122. An opposite end of the caging bolt 122 includes a caging bolt head 124 that is configured to be releasably coupled to the pressure plate 60. To use the caging bolt assembly 118, the caging bolt head 124 is inserted through the opening 126 in housing 18 and through the central opening of pressure plate 60. The caging bolt 122 is then rotated to the position shown in FIG. 1, in which it engages the pressure plate 60. A washer 92 is placed on caging bolt 122 and the adjustment nut 120 is threaded down the caging bolt 122 until the washer 92 engages the housing 18. The adjustment nut 120 is rotated to move the caging bolt head 124 toward the end wall 18a of housing 18. As the caging bolt head 124 moves, it moves the pressure plate 60 toward end wall 18a and compresses or cages the compression spring 62 between the pressure plate 60 and end wall 18a. When the brake actuator 10 is in active use on a moving vehicle, the caging bolt 122 is withdrawn through the opening 126, and the cap 128 is used to cover the opening 126, as shown in FIG. 2.

To actuate the brake of a vehicle with the service brake actuator 12, pressurized air is directed into the service brake pressure chamber 38 to push the diaphragm 30 and pressure plate 42 toward the first end wall 16a of the housing 16. This moves the pushrod 40 from the retracted position to the extended position to operate the brake of the vehicle. When the pressurized air is exhausted from the service brake pressure chamber 38, the return spring 48 pushes the pressure plate 42 and diaphragm 30 toward the second end wall 16b of the housing 16. This moves the pushrod from the extended position back to the retracted position. Similarly, to actuate the brake of a vehicle with the spring brake actuator 14, pressurized air is exhausted from the spring brake pressure chamber 56. As a result, the compression spring 62 pushes the diaphragm 32, secondary pushrod 82, and first and second pressure plates 84, 86 toward the first end wall 16a of the housing 16. As the second pressure plate 86 moves, the second pressure plate 86 pushes against the diaphragm 30 and the pressure plate 42 to move the pushrod 40 from the retracted position to the extended position. To disengage the brake, pressurized air is forced into the spring brake pressure chamber 56 to push the diaphragm 32 and pressure plate 60 toward the first end wall 18a of the housing 18. The force of the pressurized air is sufficient to overcome the force of the compression spring 62. As the pressurized air moves the diaphragm 32 toward the first end wall 18a of the housing 18, the return springs 48 and 88 move the respective pushrod 40 and secondary pushrod 82 toward the first end wall 18a as well. Further details on brake actuators may be found in U.S. Pat. No. 8,978,839, the entirety of which is hereby incorporated by reference.

Still referring to FIGS. 1-4, the brake actuator 10 includes a sensor 150 used to determine the position of a brake actuator component (e.g., the diaphragm 32 and/or pressure plate 60), which in turn may be used to determine whether the emergency/parking brakes are engaged or disengaged. The sensor 150 is configured to emit a signal directed toward a brake actuator component and to receive the signal after the signal bounces off the brake actuator component and is reflected back to the sensor. Broadly, the brake actuator component is any component or element of the brake actuator 10 that reflects the signal from the sensor 150. By determining the length of time it takes between when the signal is emitted and received by the sensor 150, the distance between the sensor 150 and the brake actuator component can be determined. In the illustrated embodiments (FIGS. 1-7), the brake actuator component is operatively coupled to the pushrod 40 and is configured to move the pushrod 40 from the retracted position to the extended position. Thus, movement of the brake actuator component corresponds to movement of the pushrod 40 and actuation of the brake of the vehicle assuming that all aspects of the brake system are operating as intended. In these embodiments, where the sensor 150 is mounted at a stationary location on the brake actuator 10, the brake actuator component is any component or element of the brake actuator 10 capable of moving as the pushrod 40 moves to actuate the brake of a vehicle (including the pushrod 40). In the illustrated embodiment shown in FIGS. 1-4, the brake actuator component the position of which is being sensed is the pressure plate 60. The sensor 150 is mounted on the first end wall 18a of the housing 18 and directs the signal toward the pressure plate 60. In other embodiments, the brake actuator component may be any one of the diaphragm 30, diaphragm 32, pressure plate 42, first pressure plate 84, second pressure plate 86, etc.

Figure 13:
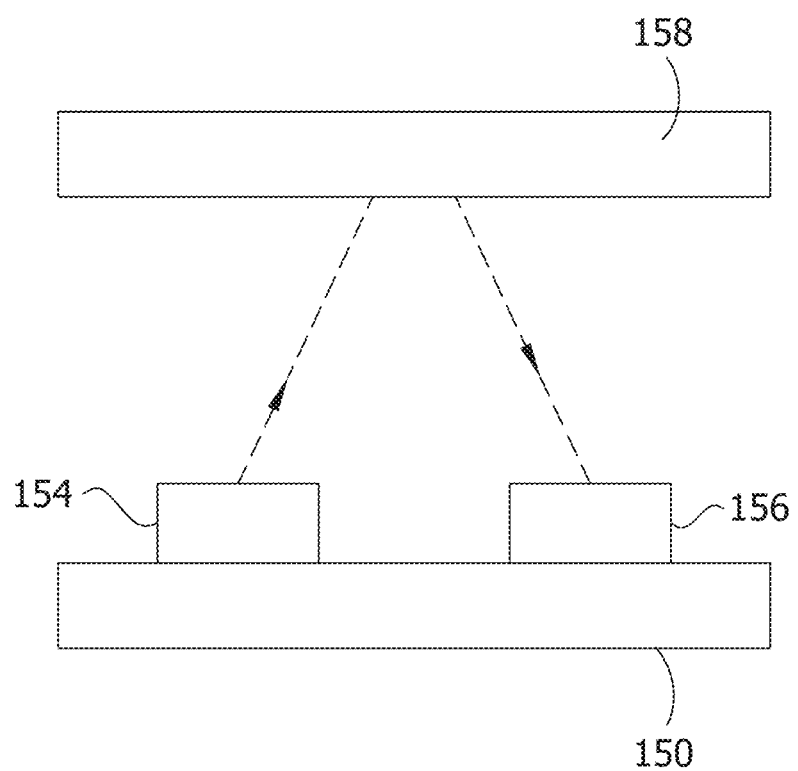
FIG. 13 is a schematic of a sensor of any of the brake actuators and/or disc brakes disclosed herein.

Referring to FIG. 13, the sensor 150 includes an emitter 154 configured to emit the signal and a receiver 156 configured to receive the signal. The emitter 154 emits the signal toward the brake actuator component 158 and the receiver 156 receives the signal after the signal bounces off the brake actuator component 158 and returns to the sensor 150. The emitter 154 and receiver 156 are both part of the sensor 150 and, therefore, are disposed at generally the same location on and/or within the brake actuator 10. For example, the sensor 150 can have a wide variety of different configurations such as a printed circuit board (PCB) base with the emitter and receiver mounted thereon. Preferably, the sensor 150 is an acoustic sensor. In this case, the signal emitted by the acoustic sensor 150 can be one of an infrasonic signal, a sonic signal or an ultrasonic signal. Other configurations of the sensor are within the scope of the present invention.

In one embodiment, the sensor 150 is communicatively coupled (either wired or wirelessly) to a controller 152 (FIG. 12), such as an onboard-computer of the vehicle. The sensor 150 is configured to transmit data to the controller 152. In one embodiment, the transmitted data is representative of the time difference between when the sensor 150 emitted the signal and when the sensor 150 received the signal. The controller 152 can then take this information (e.g., time difference) and determine the distance between the sensor 150 and the brake actuator component (e.g., pressure plate 60) by multiplying the time difference by the speed of the signal in the fluid medium (e.g., air) between the sensor 150 and brake actuator component. By knowing the distance between the sensor 150 and brake actuator component, a determination can be made by the controller 152 of the position of the brake actuator component. Specifically, the controller 152 can determine a position of the brake actuator component based on the data transmitted by the sensor 150. For example, in the illustrated embodiment where pressure plate 60 is the brake actuator component, one distance measured by the sensor 150 corresponds to the pressure plate 60 being in the retracted position shown in FIGS. 1-3, and a second, larger distance measured by the sensor 150 corresponds to the pressure plate 60 being in the extended position shown in FIG. 4. As described above, when pressure plate 60 is in the extended position, pushrod 40 is also in the extended position. Knowing the position of the pushrod 40, via the position of the brake actuator component, enables a determination to be made by the controller 152 on whether or not the pushrod 40 has actuated the brake of the vehicle. The data transmitted by the sensor 150 may include the times the signal was sent and received and/or the length of time between when the signal was sent and received. In other embodiments, the sensor 150 may determine the distance between the sensor and the brake actuator component and transmit this information to the controller 152.

The controller 152 may compare the distance recorded by the sensor 150 with a reference distance stored in the controller (e.g., the reference distance may be the distance between the sensor 150 and brake actuator component when the brake actuator component is in the retracted position). By comparing the distance recorded by the sensor with a reference distance, the controller 152 may then determine the position of the brake actuator component relative to the reference distance. For example, the controller 152 may determine how far the brake actuator component has advanced from the retracted position to the extended position. Based on this, the controller 152 may then further determine how far the pushrod 40 has extended from the end wall 16*a* of the brake actuator 10.

Second Embodiment of Brake Actuator

Figure 4:
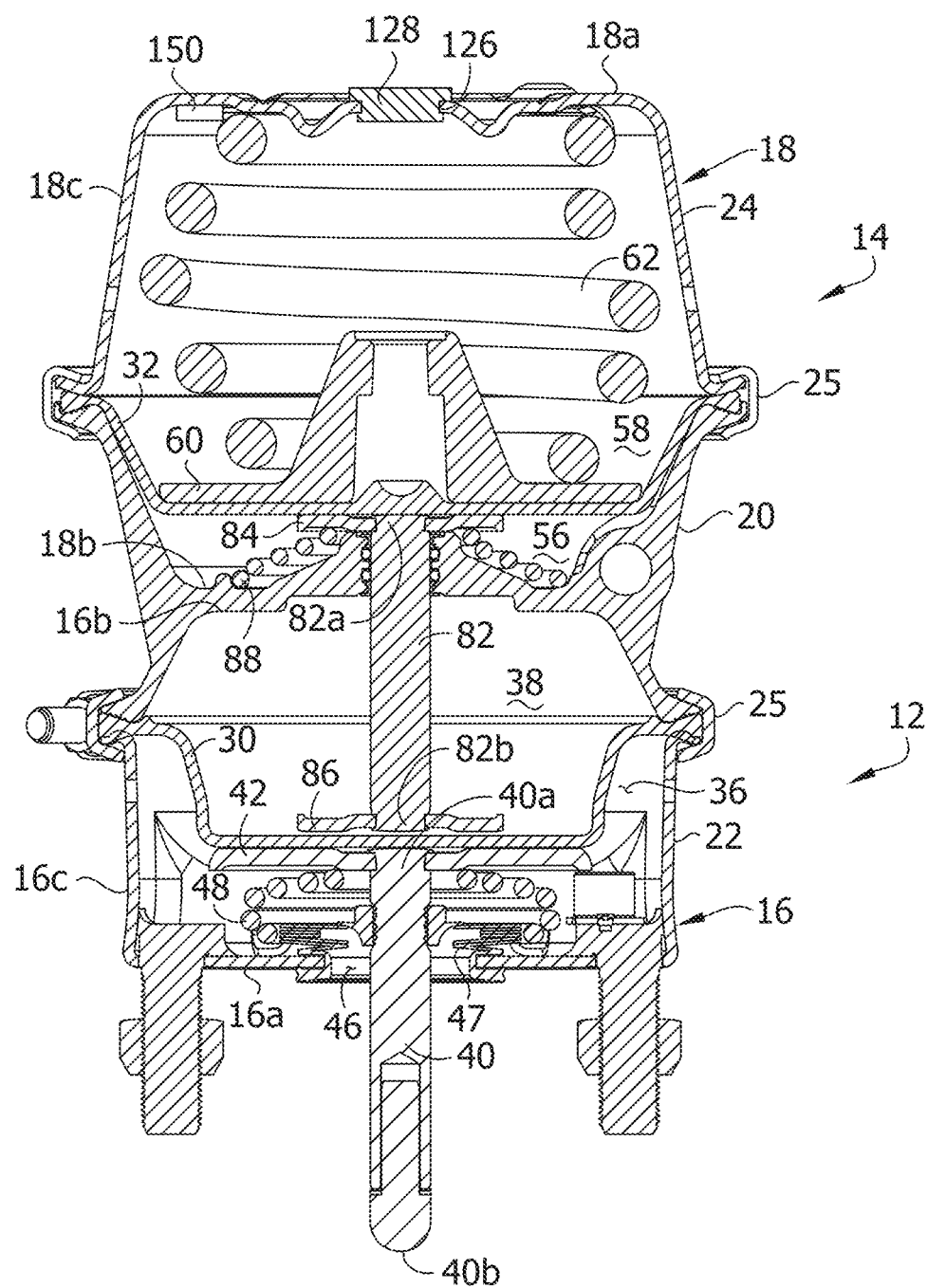
FIG. 4 is a cross-sectional view of the brake actuator of FIG. 1 showing the spring brake actuator applied.
Figure 5:
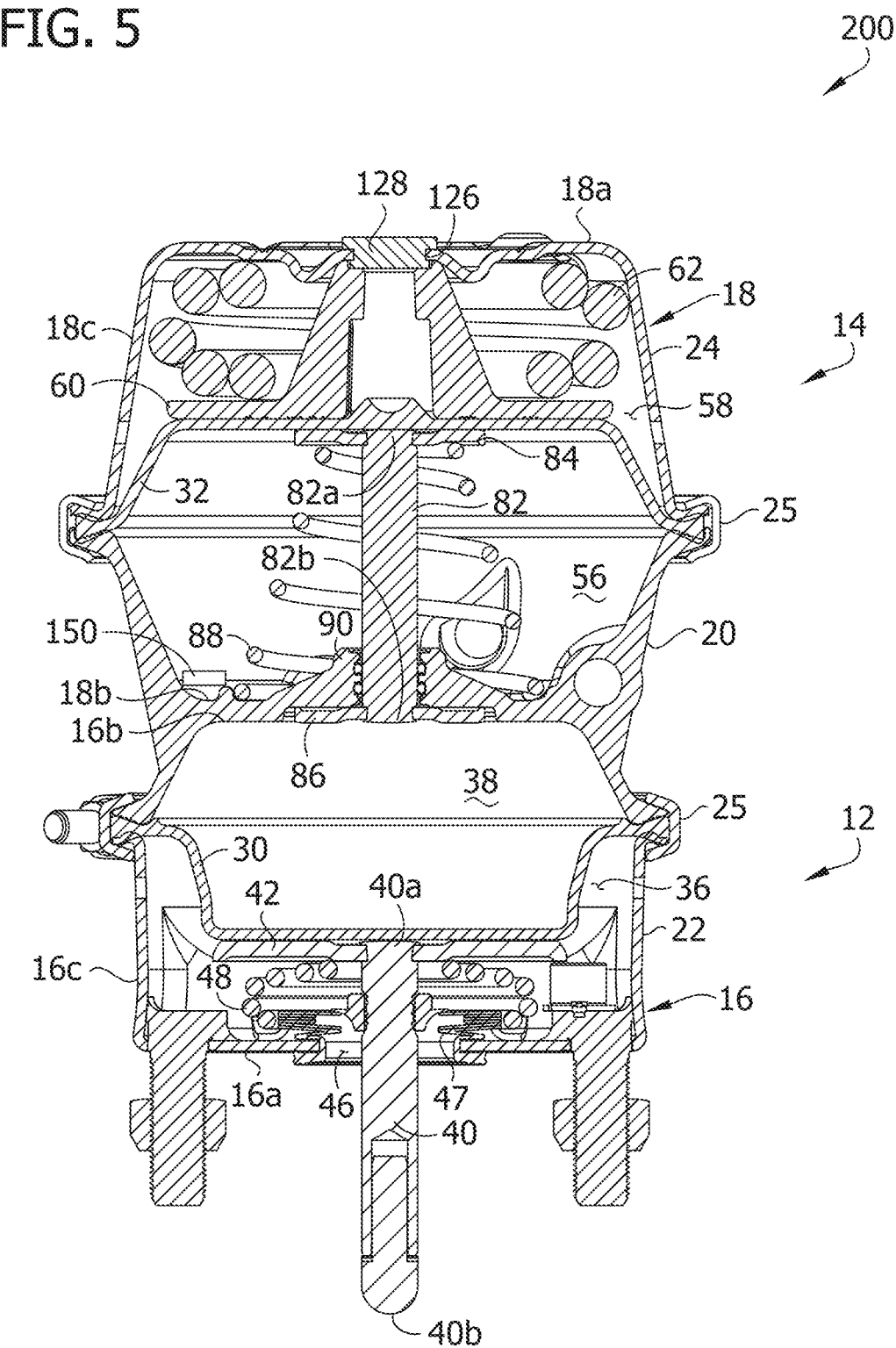
FIG. 5 is a cross-sectional view of an alternative embodiment of the pneumatic brake actuator of FIG. 3.

An alternative embodiment of a brake actuator, generally indicated by reference numeral 200, where the diaphragm 32 is the brake actuator component is shown in FIG. 5. In this embodiment, the sensor 150 is disposed on the second end wall 18*b* of the housing 18. The brake actuator 200 is generally identical to brake actuator 10 except that the sensor 150 is mounted on the second end wall 18*b* of the housing 18 and emits a signal toward the diaphragm 32, which is the brake actuator component in this case. In this embodiment, the distance between the sensor 150 and diaphragm 32 is used to determine the position of the diaphragm 32, which as described above in connection with the embodiment shown in FIGS. 1-4 may be used to determine whether the emergency/parking brakes are engaged or disengaged. It is understood that the distance between the sensor 150 and diaphragm 32 decreases when the diaphragm 32 and pushrod 40 are moved from the retracted position to the extended position in this embodiment. Controller 152 may be used with brake actuator 200 in substantially the same manner as described above with respect to brake actuator 10.

Third Embodiment of Brake Actuator

Figure 6:
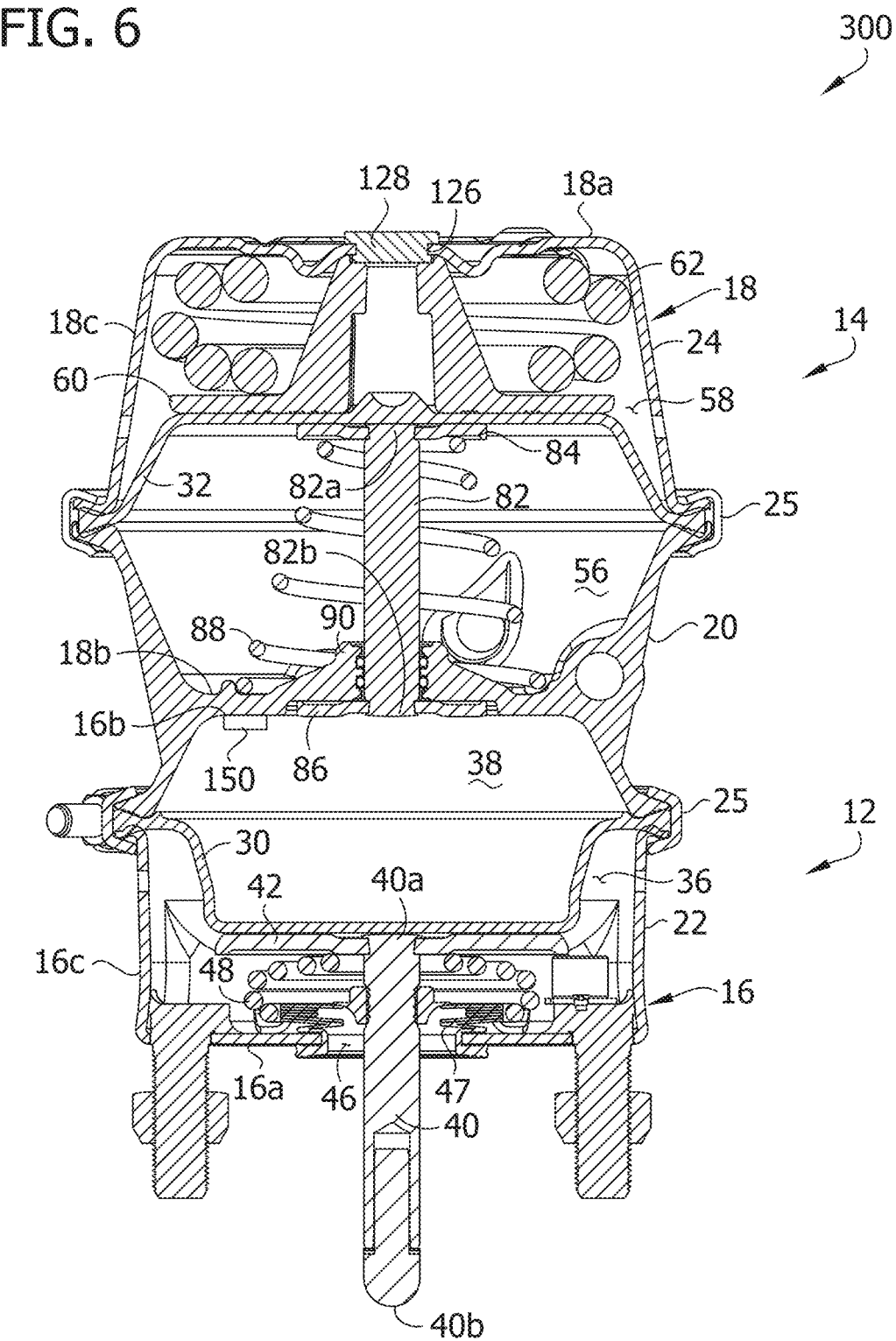
FIG. 6 is a cross-sectional view of an alternative embodiment of the pneumatic brake actuator of FIG. 3.

Another alternative embodiment of a brake actuator, generally indicated by reference numeral 300, where the diaphragm 30 is the brake actuator component is shown in FIG. 6. In this embodiment, the sensor 150 is disposed on the second end wall 16*b* of the housing 16. The brake actuator 300 is generally identical to brake actuator 10 except that the sensor 150 is mounted on the second end wall 16*b* of the housing 16 and emits a signal toward the diaphragm 30, which is the brake actuator component in this case. In this embodiment, the distance between the sensor 150 and diaphragm 30 is used to determine the position of the diaphragm 30, which also corresponds with the position of pushrod 40. Controller 152 may be used with brake actuator 300 in substantially the same manner as described above with respect to brake actuator 10.

Fourth Embodiment of Brake Actuator

Figure 7:
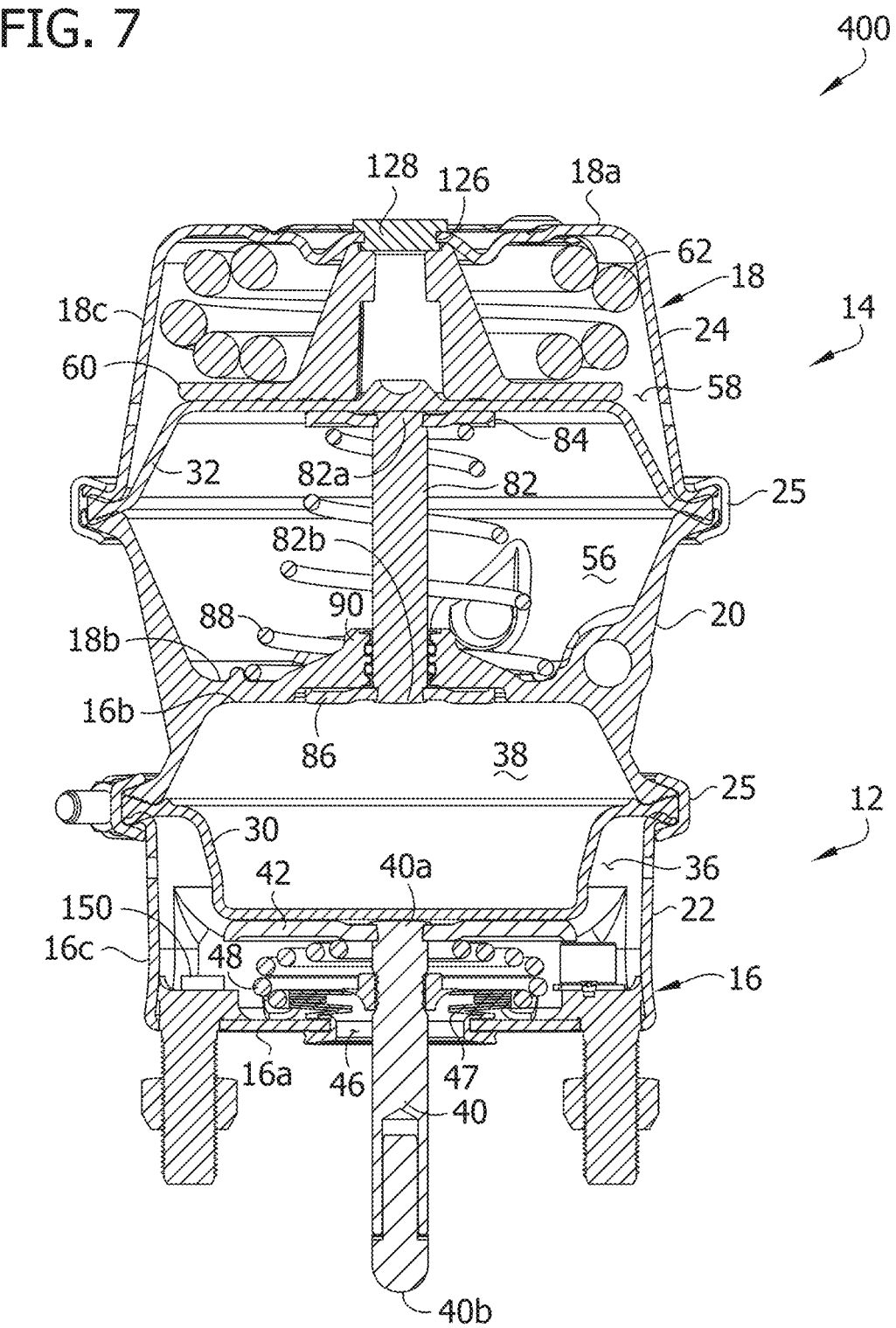
FIG. 7 is a cross-sectional view of an alternative embodiment of the pneumatic brake actuator of FIG. 3.

Another alternative embodiment of a brake actuator, generally indicated by reference numeral 400, where the diaphragm 30 or pressure plate 42 is the brake actuator component is shown in FIG. 7. In this embodiment, the sensor 150 is disposed on the first end wall 16*a* of the housing 16. The brake actuator 400 is generally identical to brake actuator 300 except that the sensor 150 is mounted on the first end wall 16*a* of the housing 16 and emits a signal toward the diaphragm 30 or pressure plate 42, which is the brake actuator component in this case. In this embodiment, the distance between the sensor 150 and diaphragm 30 or pressure plate 42 is used to determine the position of the diaphragm 30 or pressure plate 42, which corresponds with the position of pushrod 40. It is understood that the distance between the sensor 150 and diaphragm 30 decreases when the pushrod 40 is moved from the retracted position to the extended position in this embodiment. Controller 152 may be used with brake actuator 400 in substantially the same manner as described above with respect to brake actuator 10.

Additional Embodiments of Brake Actuator

Other configurations of the sensor 150 and brake actuator component are within the scope of the present invention. The sensor 150 and brake actuator component may both move as the pushrod 40 moves or the sensor 150 may move relative to the brake actuator component (e.g., the brake actuator component is stationary) as the pushrod 40 moves. For example, in one embodiment the sensor 150 may be mounted on a component (e.g., diaphragm 30, diaphragm 32, pressure plate 42, first pressure plate 84, second pressure plate 86, etc.) that moves with the pushrod 40 and the brake actuator component is stationary relative to the pushrod 40. In one such example, the sensor 150 may be mounted on pressure plate 60 and be configured to emit a signal toward the first end wall 18a of the housing 18, which is the brake actuator component in this case. Thus, other configurations are possible where the sensor 150 and brake actuator component are configured to move relative to one another as the pushrod 40 moves between the retracted and extended positions.

Figure 3:
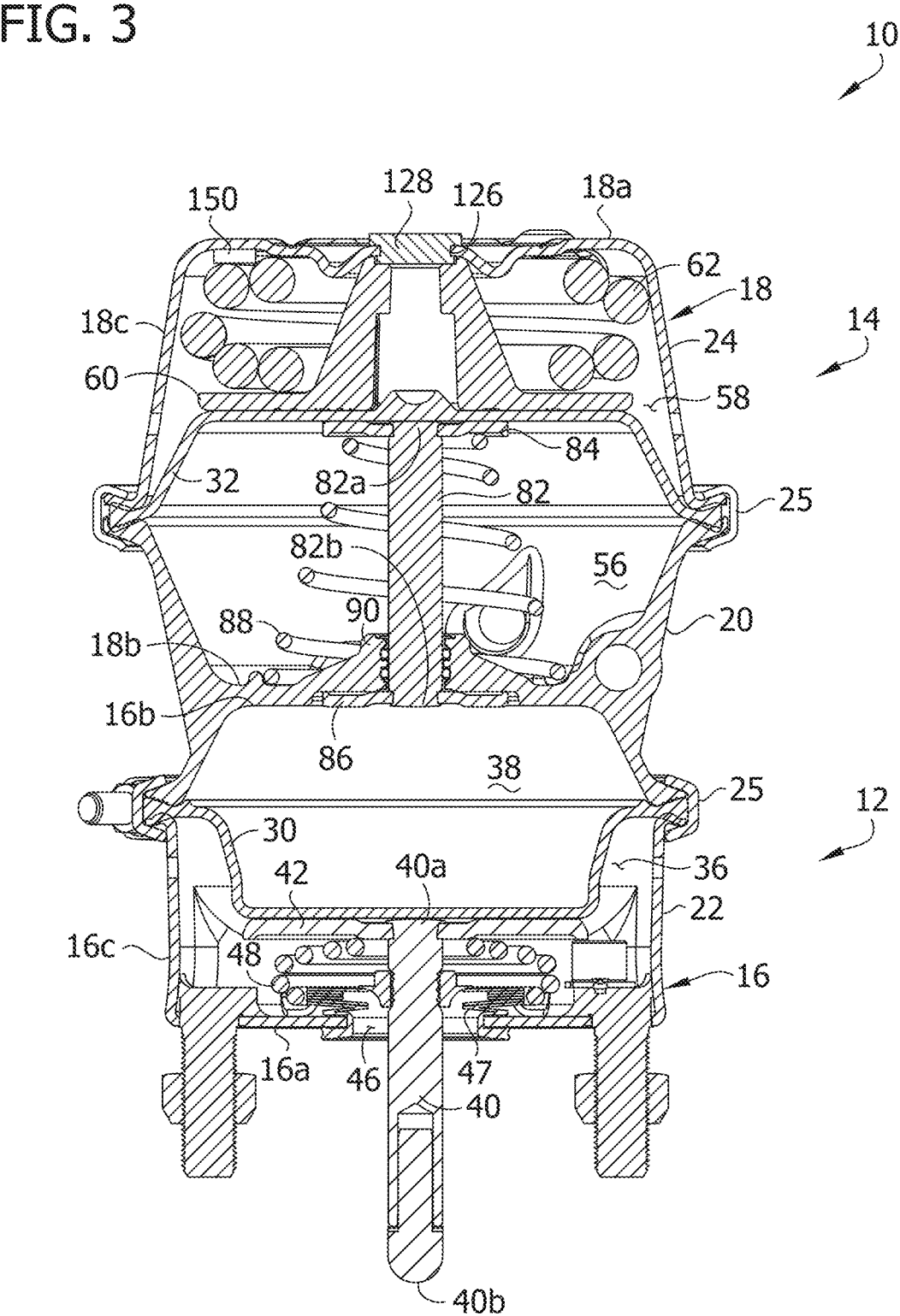
FIG. 3 is a cross-sectional view of the brake actuator of FIG. 1 showing the service brake actuator applied.
Figure 12:
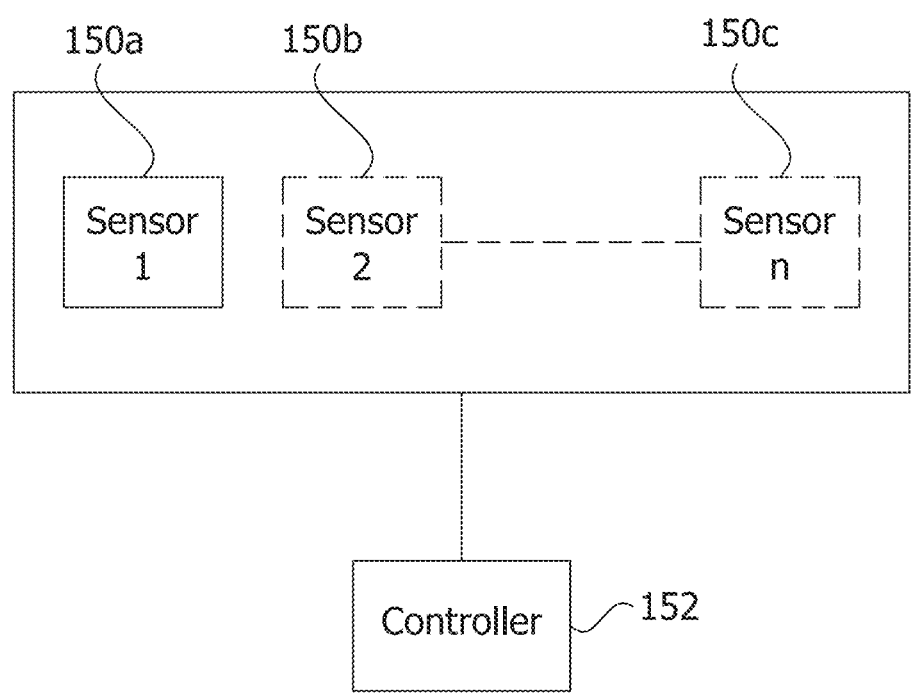
FIG. 12 is a block diagram showing a controller that may be used with any of the brake actuators and/or disc brakes disclosed herein.

Further, multiple sensors 150 may be used with brake actuators 10, 200, 300, and 400. For example, brake actuator 10 may include a first sensor 150 that is positioned in the spring brake housing 18 and configured to sense the position of the diaphragm 32 or pressure plate 60 (e.g., as shown in FIGS. 1-5 and described above) and a second sensor 150 that is positioned in the service brake housing 16 and configured to sense the position of the diaphragm 30 or pressure plate 42 (e.g., as shown in FIGS. 1-6 and described above). Multiple sensors 150 may be used with brake actuator 10 in this manner to both determine whether the emergency/parking brakes of the brake actuator 10 are actuated (as shown in FIG. 4) and to determine whether the service brakes of the brake actuator 10 are actuated when the emergency/parking brake are not actuated (as shown in FIG. 3). In addition, brake actuator 10 may include multiple sensors 150 to sense the position of the diaphragm 32 or pressure plate 60. For example, a first sensor 150 may be placed in the location shown in FIGS. 1-4 and a second sensor 150 may be placed in the location shown in FIG. 5. Multiple sensor 150 may be used with brake actuator 10 in this manner for redundancy purposes. Likewise, brake actuator 10 may include multiple sensors 150 to sense the position of the diaphragm 30 or pressure plate 42. For example, a first sensor 150 may be placed in the location shown in FIG. 6 and a second sensor 150 may be placed in the location shown in FIG. 7 for redundancy. FIG. 12 shows one example of a multiple sensor system, in which controller 152 may be communicatively coupled to any number of sensors 150, including a first sensor 150a, a second sensor 150b, and an nth sensor 150c.

The controller 152 may further receive information from other components of the vehicle's braking system and compare that information to the data transmitted by the sensor 150. For example, the controller 152 may receive a pressure signal that corresponds with a service brake pressure of the braking system (i.e., the pressure of the system connected to service brake pressure chamber 38) and/or a pressure signal that corresponds with a spring/emergency brake pressure of the braking system (i.e., the pressure of the system connected to spring brake pressure chamber 56). When sensor 150 is positioned to measure the diaphragm 30 or pressure plate 42 of the service brake actuator 12, the controller 152 may compare the actual position of the diaphragm 30 or pressure plate 42 as measured by sensor 150 with an expected position of the diaphragm 30 or pressure plate 42 based on the pressure signal corresponding with the service brake pressure. Likewise, when sensor 150 is positioned to measure the diaphragm 32 or pressure plate 60 of the spring brake actuator 14, the controller 152 may compare the actual position of the diaphragm 32 or pressure plate 60 as measured by sensor 150 with an expected position of the diaphragm 32 or pressure plate 60 based on the pressure signal corresponding with the spring brake pressure. If the actual position is different from the expected position by more than a predetermined amount, the controller 152 may generate an error signal. The controller 152 may be communicatively coupled to a visual indicator (e.g., a display screen) positioned in a cab of the vehicle. The controller 152 may send the error signal to the visual indicator to alert a driver of a potential issue with the braking system. The controller 152 may further be communicatively coupled to an external computer system with the capability to log the error signal and alert personnel of a potential issue with the vehicle's braking system. The controller 152 may also be communicatively coupled to an ABS system of the vehicle, a roll stability system of the vehicle, and/or an electronic suspension control system of the vehicle for receiving data from the various vehicle systems and comparing such data to the data from sensors 150.

Sensor 150 provides many advantages over conventional position sensing systems. Conventional hall-effect sensors and magnetic sensors require isolation from the metal components in the brake actuator except for the component being detected or measured which must itself comprise metal and must be in close proximity to the component being detected. Sensor 150 does not have these limitations, allowing the sensor 150 to be placed at generally any position on the brake actuator. Further, sensor 150 has the ability to measure the movement of components composed of materials other than metal. Conventional string potentiometers require physical attachment to the component being measured, which is not required by sensor 150. Conventional contact sensors and sensors utilizing mechanical rotation also rely on mechanical interfaces which can fail and generally have lower reliability and accuracy. Sensor 150 is a non-contact sensor without mechanical interfaces, resulting in more reliability and better accuracy. Sensor 150 is also generally a more cost-effective solution compared to conventional optical sensors, which are also sensitive to changes in optical reflectivity.

First Embodiment of Disc Brake

Referring to FIGS. 8-11, alternative embodiments are shown with the sensor 150 mounted on a disc brake, generally indicated at reference numeral 500. As will be explained in more detail below, in these embodiments the sensor 150 is used to measure a distance between itself and a disc brake component to determine the position of the disc brake component and likewise determine whether or not the disc brake 500 has engaged a brake disc (not shown) of the vehicle.

Figure 10:
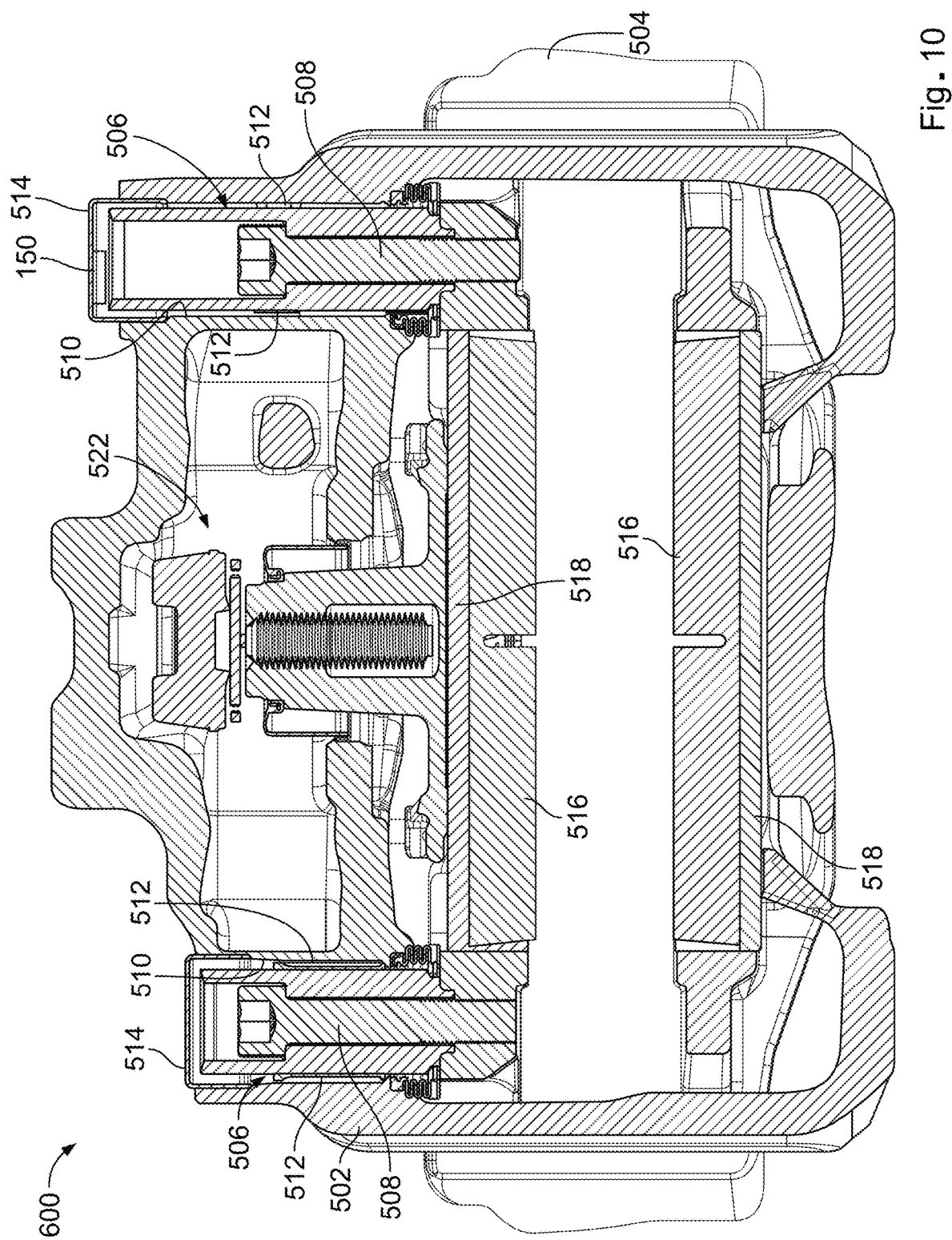
FIG. 10 is a cross-sectional view of an alternative embodiment of the disc brake of FIG. 8, taken through line 10-10 of FIG. 8.

The disc brake 500 includes a brake caliper 502 which is slideably guided on a carrier 504 by slide pins 506 (FIG. 10). The slide pins 506 are fixed to the carrier 504 by bolts 508 and received in openings 510 in the housing of the brake caliper 502. Bushings 512 are provided between the slide pins 506 and the inner wall of the openings 510. End caps 514 sealingly close the openings 510 to protect the slide pins 506 and bushings 512.

The brake caliper 502 overlaps and surrounds brake pads 516 (e.g., first and second brake pads) which are mounted on brake pad retainers 518. Each brake pad retainer 518 is configured to support one of the brake pads 516. A holding bracket 520 overlaps the brake pads 516 and brake pad retainers 518 and secures the brake pads 516 and brake pad retainers 518 in the disc brake 500. Releasing the holding bracket 520 enables the brake pads 516 and brake pad retainers 518 to be inserted and removed from the disc brake 500. The opposing brake pads 516 are positioned on opposite sides of a brake disc (not shown), which is operatively fixed to a hub of a wheel axle. The disc brake 500 is configured to move the brake pads 516 toward one another to engage the brake disc, thereby braking the vehicle.

Figure 8:
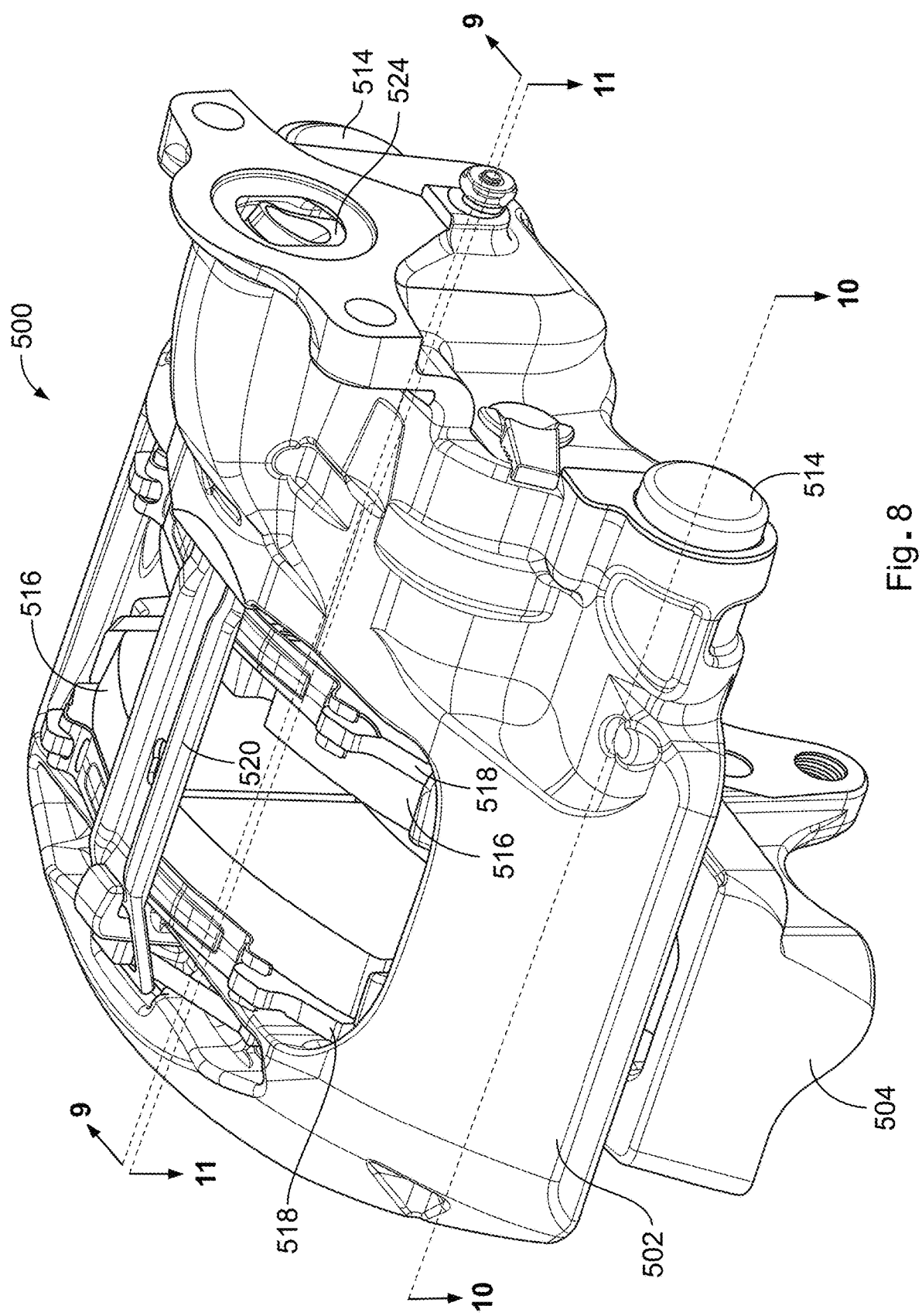
FIG. 8 is a perspective view of a disc brake.
Figure 9:
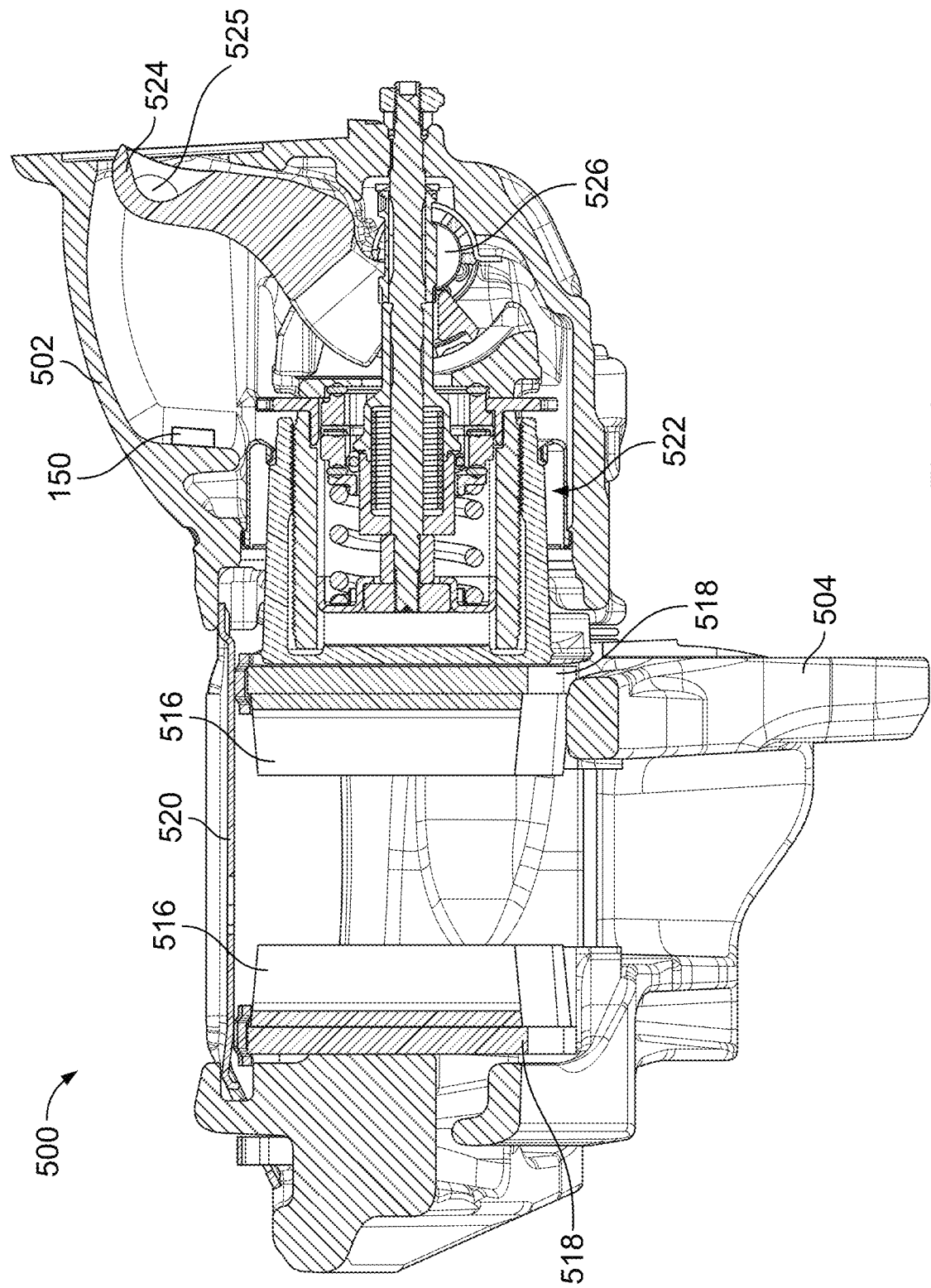
FIG. 9 is a cross-sectional view of the disc brake taken through line 9-9 of FIG. 8.

The disc brake 500 includes a brake actuation mechanism 522 that, when actuated, moves the brake pads 516 toward one another to engage the brake disc and brake the vehicle. The brake actuation mechanism 522 is housed within the caliper 502. The brake actuation mechanism 522 includes a lever 524, which has an upper end that is positioned adjacent an opening in the caliper 502 and is operatively coupled to the brake actuator 10. Specifically, the lever 524 has a recess 525 that receives an end of the pushrod 40 of the brake actuator 10 such that movement of the pushrod 40 moves the lever 524 to actuate the disc brake 500. The lever 524 is pivotably supported by the caliper 502 against two rollers 526. As the lever 524 is pivoted or rotated around the rollers 526 by the pushrod 40 from the brake actuator 10, the structure of the lever 524 causes an eccentric displacement or offset of the lever 524 toward the brake pads 516, which moves the brake pads 516 into engagement with the brake disc as the caliper 502 slides on the slide pins 506 to the right when viewed as shown in FIGS. 8 and 9. Further details on the construction and operation of the disc brake 500 may be found in U.S. Pat. No. 9,803,711, the entirety of which is hereby incorporated by reference.

As mentioned above, the disc brake 500 includes the sensor 150 used to measure a distance between itself and a disc brake component to determine the position of the disc brake component and whether or not the disc brake 500 has engaged the brake disc of the vehicle. The operation of the sensor 150 when included as part of the disc brake 500 is generally the same as the operation of the sensor 150 when included as part of the brake actuator 10. Accordingly, it is understood the teachings of the sensor 150 set forth in relation to the brake actuator 10 apply equally to the sensor's 150 application with the disc brake 500 and vice versa.

The sensor 150 is configured to emit the signal toward the disc brake component and to receive the signal after the signal bounces off the disc brake component and is reflected back to the sensor 150. Broadly, the disc brake component is any component or element of the disc brake 500 that reflects the signal from the sensor 150. By determining the length of time it takes between when the signal is emitted and received by the sensor 150, the distance between the sensor 150 and the disc brake component can be determined. The disc brake component and sensor 150 move relative to one another as the brake pads 516 are moved. Thus, as the brake pads 516 are moved into and out of engagement with the brake disc, the distance between the sensor 150 and disc brake component changes. As mentioned above, the sensor 150 can be communicatively coupled to a controller 152, which can be configured to determine the position of the disc brake component based on the data received from the sensor 150. This information (e.g., the position of the disc brake component) can then be used to determine whether or not the disc brake 500 is braking the vehicle (e.g., whether or not the brake pads 516 are engaging the brake disc). For example, similar to as described above with respect to the brake actuator 10, the controller 152 may compare the distance recorded by the sensor 150 with a reference distance stored in the controller (e.g., a distance between the sensor 150 and disc brake component when the disc brake 500 is not actuated). By comparing the distance recorded by the sensor 150 with the reference distance, the controller 152 may then determine the position of the disc brake component relative to the reference distance. For example, the controller 152 may determine how far the disc brake component has advanced from the unactuated position to the actuated position. Based on the distance of movement of the disc brake component, the controller 152 may further be capable of determining how far the brake pads 516 have moved toward the brake disc.

In the illustrated embodiments (FIGS. 8-11), the disc brake component is operatively coupled to the brake pads 516 and is configured to move as the brake pads 516 are moved toward each other (e.g., the disc brake component moves relative to the sensor 150 as the brake pads 516 move). Thus, movement of the disc brake component corresponds to movement of the brake pads 516 and actuation of the disc brake 500. In these embodiments, the disc brake component can be any component or element of the disc brake 500 that moves as the brake pads 516 move. Further, the sensor 150 may be mounted at a stationary location (e.g., on the carrier 504 or slide pins 506) or on a component that moves relative to the disc brake component (e.g., on the caliper 502). In addition, both the sensor 150 and disc brake component may move as the disc brake 500 is actuated (e.g., as described below in connection with FIG. 11). In the illustrated embodiment shown in FIGS. 8 and 9, the disc brake component is the lever 524. The sensor 150 is mounted on the caliper 502 and directs the signal toward the lever 524, specifically the upper end thereof. In other embodiments, the disc brake component may be any one of the slide pins 506, brake pad retainers 518, brake pads 516, another component of the brake actuation mechanism 522, etc.

Second Embodiment of Disc Brake

An alternative embodiment of a disc brake, generally indicated by reference numeral 600, where the slide pin 506 is the disc brake component is shown in FIG. 10. In this embodiment, the sensor 150 is disposed on the end cap 514. The disc brake 600 is generally identical to disc brake 500 except that the sensor 150 is mounted on one of the end caps 514 and emits a signal toward the corresponding slide pin 506, which is the disc brake component in this case. In this embodiment, the distance between the sensor 150 and slide pin 506 is used to determine whether or not the disc brake 500 is braking the vehicle. In this case, the sensor 150 moves with movement of the caliper 502 and the slide pin 506 remains stationary. The distance between the sensor 150 and the end of the slide pin 506 increases as the brakes are applied. Controller 152 may be used with disc brake 600 in substantially the same manner as described above with respect to disc brake 500.

Third Embodiment of Disc Brake

Figure 11:
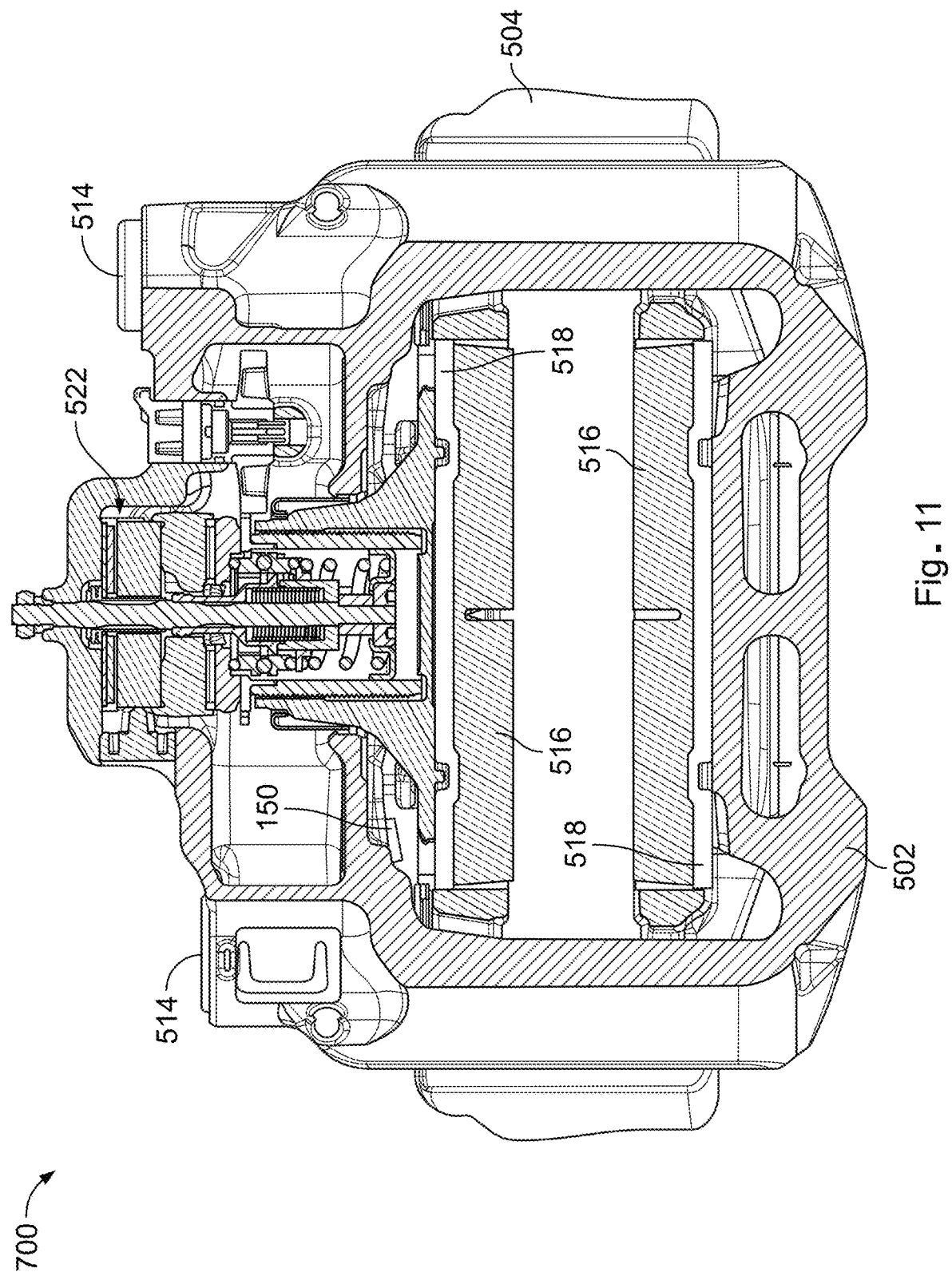
FIG. 11 is a cross-sectional view of an alternative embodiment of the disc brake of FIG. 8, taken through line 11-11 of FIG. 8.

Another alternative embodiment of a disc brake, generally indicated by reference numeral 700, where the brake pad retainer 518 is the disc brake component is shown in FIG. 11. In this embodiment, the sensor 150 is disposed on a side wall of the caliper 502 facing the brake pad retainer 518. The disc brake 700 is generally identical to disc brake 500 except that the sensor 150 is mounted at a different position on the caliper 502 and emits a signal toward one of the brake pad retainers 518, which is the disc brake component in this case. In this embodiment, the distance between the sensor 150 and brake pad retainer 518 is used to determine whether or not the disc brake 500 is braking the vehicle. The sensor 150 moves with movement of the caliper 502 in one direction and the brake pad retainer 518 moves in an opposite direction toward the brake disc. The distance between the sensor 150 and the brake pad retainer 518 increases as the brakes are applied. Controller 152 may be used with disc brake 700 in substantially the same manner as described above with respect to disc brake 500.

Additional Embodiments of Disc Brake

Other configurations of the sensor 150 and disc brake component are within the scope of the present disclosure. The sensor 150 and disc brake component may both move as the brake pads 516 move, the sensor 150 may move relative to the disc brake component (e.g., the disc brake component is stationary) as the brake pads 516 move, or the disc brake component may move relative to the sensor (e.g., the sensor is stationary). For example, in one embodiment the sensor 150 may be mounted on a component (e.g., carrier 504 or slide pins 506) that does not move with the brake pads 516 while the disc brake component moves with the brake pads 516 (e.g., the disc brake component is operatively coupled to the brake pads 516 and moves relative to the sensor 150 as the brake pads 516 move). In one such example, the sensor 150 may be mounted on the slide pin 506 and be configured to emit a signal toward the end cap 514, which is the disc brake component in this case.

Similar to as described above with respect to brake actuator 10, multiple sensors 150 may be used with disc brakes 500, 600, and 700. For example, disc brake 500 may include any combination of a first sensor 150 that is positioned to sense the position of lever 524, as shown in FIG. 9, a second sensor 150 that is positioned to sense the position of brake pad retainer 518, as shown in FIG. 11, and a third sensor 150 that is positioned to sense the position of slide pin 506, as shown in FIG. 10. Multiple sensors 150 may be used with disc brake 500 in this manner for redundancy purposes or to detect whether there is a potential error with operation of disc brake 500. For example, the controller 152 may compare the data received from the sensors 150 to determine if there is a discrepancy between an actual reading received from a sensor and an expected reading based on data received from another sensor. If the sensor 150 sensing the position of lever 524 indicates that lever 524 is actuated, while the sensor 150 sensing the position of brake pad retainer 518 indicates that the brake pad retainer 518 has not moved an expected distance based on actuation of lever 524, the controller 152 may generate an error signal indicating that there is a potential error in operation of disc brake 500. The controller 152 when used with the disc brake 500 may further receive information from other components of the vehicle's braking system (e.g., service brake pneumatic system, spring brake pneumatic system, ABS system, roll stability system, and/or electronic suspension control system) and compare that information to the data transmitted by the sensor 150, as described above in connection with brake actuator 10.

Example issues that may be detected by the controller 152 include a dragging brake (i.e., brake pads 516 engage a brake disc at an undesired time and/or with an undesired amount of pressure), a broken parking brake compression spring 62, and a chamber over stroke condition (i.e., the second end 40b of the pushrod 40 is extended farther away from the end wall 16a than desired). A dragging brake may be detected, for example, by determining that the brake pad retainer 518 and brake pad 516 are at a greater distance than desired from sensor 150 (see FIG. 11) at a particular time. A broken parking brake compression spring 62 may be detected, for example, by determining that the diaphragm 32, pressure plate 60, diaphragm 32, and/or pressure plate 42 are not in a position consistent with actuation of the brakes (i.e., they have not moved an expected distance toward end wall 16a) when pressure is released from the spring brake pressure chamber 56. A chamber over stroke condition may be detected, for example, by determining that the diaphragm 30 and/or pressure plate 42 have moved more than an expected distance toward end wall 16a when the brakes are actuated.

Brake System

A brake system that includes both at least one of brake actuators 10, 200, 300 or 400 and at least one of disc brakes 500, 600, or 700 is also within the scope of the present invention. In such a system, one or more sensors 150 may sense the position of components of the brake actuator 10, 200, 300, or 400, as described above, and one or more sensors 150 may sense the position of components of the disc brake 500, 600, or 700, as described above. The controller 152 may be communicatively coupled to all of the sensors, as shown in FIG. 12, and receive the data from the sensors 150 of both the brake actuator 10, 200, 300, or 400 and disc brake 500, 600, or 700. The controller 152 may determine positions of components of the brake actuator 10, 200, 300, or 400 and/or disc brake 500, 600, or 700 in the same manner as described above with respect to brake actuator 10 and disc brake 500. The controller 152 may further compare the data received from the various sensors 150 to determine if there is a potential error with operation of either the brake actuator 10, 200, 300, or 400 or the disc brake 500, 600, or 700. For example, if a sensor 150 associated with the brake actuator 10 indicates that the brake actuator 10 is not actuated, while a sensor 150 associated with the disc brake 500 indicates that the disc brake 500 is actuated, the controller 152 may generate an error signal indicating a potential error in operation of the disc brake 500 (e.g., the disc brake 500 has not reset to its unactuated position).

The specific arrangements of the sensor 150 described in this application are exemplary only as other types of arrangements are contemplated by and fall within the scope of the present invention.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A disc brake, comprising:
   opposing first and second brake pads configured to move toward one another to engage a brake disc of a vehicle;
   a disc brake component comprising at least one of a lever of a brake actuation mechanism or a slide pin of a brake carrier; and
   a sensor mounted remote from the disc brake component and configured to measure a distance between itself and the disc brake component by emitting a signal directed toward the disc brake component and receiving the signal after the signal bounces off the disc brake component and is reflected back to the sensor, wherein at least one of the disc brake component and the sensor are configured to move relative to the other of the disc brake component and the sensor as the first and second brake pads move.

2. The disc brake of claim 1, further comprising a controller, wherein the controller is communicatively coupled to the sensor and is configured to determine a position of the disc brake component based on data received from the sensor.

3. The disc brake of claim 2, wherein the sensor is configured to transmit the data to the controller, the data representative of the time difference between when the sensor emitted the signal and when the sensor received the signal.

4. The disc brake of claim 1, wherein the sensor is an acoustic sensor.

5. The disc brake of claim 4, wherein the signal emitted by the acoustic sensor is one of an infrasonic signal, a sonic signal, or an ultrasonic signal.

6. The disc brake of claim 1, wherein the sensor includes an emitter configured to emit the signal and a receiver configured to receive the signal.

7. The disc brake of claim 6, wherein the emitter and receiver are disposed at generally the same location.

8. The disc brake of claim 1, wherein the disc brake component is operatively coupled to the first and second brake pads and is configured to move relative to the sensor as the first and second brake pads move.

9. The disc brake of claim 1, wherein the sensor is operatively coupled to the first and second brake pads and is configured to move relative to the disc brake component as the first and second brake pads move.

* * * * *